E. W. STURDY.
HEATING APPARATUS.

No. 179,623. Patented July 4, 1876.

WITNESSES: INVENTOR:

UNITED STATES PATENT OFFICE.

EDWARD W. STURDY, OF PROVIDENCE, RHODE ISLAND.

IMPROVEMENT IN HEATING APPARATUS.

Specification forming part of Letters Patent No. 179,623, dated July 4, 1876; application filed April 15, 1876.

*To all whom it may concern:*

Be it known that I, EDWARD W. STURDY, of the city of Providence, in the county of Providence and State of Rhode Island, have invented a new and useful Improvement in Heating Apparatus, which improvement is fully set forth in the following specification, reference being had to the accompanying drawings.

Figure 1:
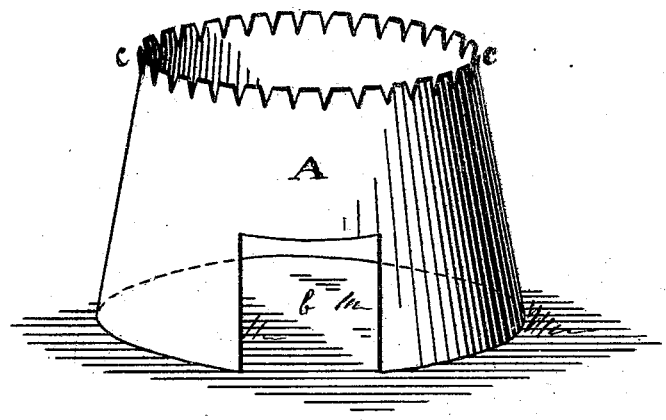
Figure 2:
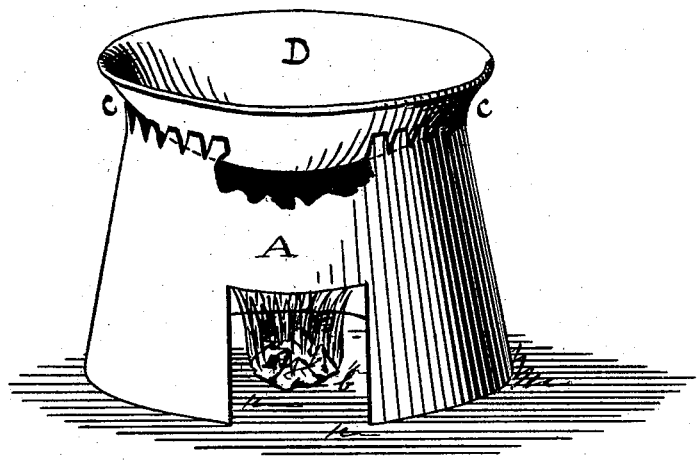

The object of my invention is to secure speed in heating as well as economy in the use of fuel in the following manner, viz: I have a furnace, A, as shown in the accompanying drawings. The furnace is provided with the draft-opening $b$ (also shown in the drawings) sufficiently large to secure perfect combustion, and with a serrated edge, $c\,c$, as indicated at the upper end of the furnace. Upon this edge, so partially indented as to allow close bearings for any receptacle, as D, (shown in Fig. 2,) it is designed to place any sauce-pan or vessel containing any liquid, solid, or substance to be heated. Fuel is to be placed within the furnace, and beneath the receptacle, as D, whether paper, wood, or other heat-producing substance. The columns of heated air, by means of the false chimneys formed by the serrated edge of the furnace, are compelled to traverse the whole outer surface of the receptacle D, even to its upper edge, while the closed sides of the furnace prevent the cooler outside air from chilling the air within the furnace heated by the burning substance.

The method of operating the apparatus is as follows: Place the furnace on an earthen, metallic, or other plate. Tear ordinary newspaper into square pieces of a size easily placed beneath the furnace through the draft $b$. Place the receptacle covered, and containing, for instance, water, upon the furnace. Now, light one piece of newspaper, place it under the furnace, and feed the flame with newspaper, piece by piece, taking care to maintain a constant flame thereunder until the water comes to a boil, which can be done in four minutes. Or in a similar sauce-pan place a steak, with a little butter upon and beneath the same, cover, apply heat in the same way, and it can be cooked in about three minutes with half a newspaper. Eggs and other food may in a similar manner be thus speedily and economically cooked. The same apparatus, when a longer application of heat is required for any purpose, may be provided with grate-bars and ash-pit for burning wood, coals, and other substances, and also with a hood and chimney above the furnace for carrying off the smoke, gases, and the like generated by the combustion. A spirit-lamp or flame of gas, or other means of heating, may also be applied beneath the furnace to produce any required and constant heat for domestic, mechanical, or other purposes, whereby great saving is effected in the amount of fuel required for any given purpose.

I claim—

As a new article of manufacture, the hereinbefore-described furnace A, having a draft-opening, $b$, at the base, and the outwardly-flaring serrated edges $c$ at the top to equalize the even distribution of heat upon the rounded sides of a culinary vessel, substantially as described and shown.

EDWARD W. STURDY.

Witnesses:
HENRY BASSETT,
WM. F. MACOMBER.